US012370657B2

(12) United States Patent
Liu

(10) Patent No.: US 12,370,657 B2
(45) Date of Patent: Jul. 29, 2025

(54) HEX WRENCH STRUCTURE

(71) Applicant: Ningbo King Mount Co., Ltd., Ningbo (CN)

(72) Inventor: Kuan-Ting Liu, Taichung (TW)

(73) Assignee: NINGBO KING MOUNT CO., LTD., Ningbo (CN)

( * ) Notice: Subject to any disclaimer, the term of this patent is extended or adjusted under 35 U.S.C. 154(b) by 387 days.

(21) Appl. No.: 18/171,875

(22) Filed: Feb. 21, 2023

(65) Prior Publication Data

US 2024/0278397 A1 Aug. 22, 2024

(51) Int. Cl.
*B25B 23/10* (2006.01)
*B25B 15/00* (2006.01)

(52) U.S. Cl.
CPC .......... *B25B 23/108* (2013.01); *B25B 15/008* (2013.01)

(58) Field of Classification Search
CPC ... B25B 15/002; B25B 15/004; B25B 15/008; B25B 23/108; B25B 23/10
See application file for complete search history.

(56) References Cited

U.S. PATENT DOCUMENTS 5,237,893 A * 8/1993 Ryder .................. B25B 15/005 81/436
5,927,165 A * 7/1999 Vasudeva ............. B25B 23/108 81/448
6,681,662 B2 * 1/2004 Blackston ............. B25B 15/008 81/436
6,684,741 B2 * 2/2004 Blackston ............. B25B 23/106 81/436
6,971,293 B2 * 12/2005 Appenzeller ......... B25B 23/108 81/177.85
7,017,457 B2 * 3/2006 Nessbaum ............ B25B 23/108 81/177.85
7,137,322 B2 * 11/2006 Mark .................... B25B 23/105 81/436
8,371,191 B2 * 2/2013 Huang .................. B25B 15/008 81/453
9,314,907 B2 * 4/2016 Wang .................... B25B 15/008
10,005,174 B2 * 6/2018 Wang .................... B25B 15/002
2003/0164075 A1 * 9/2003 Blackston ............. B25B 23/105 81/451
2016/0158926 A1 * 6/2016 Wang .................... B25B 15/008 81/436

* cited by examiner

*Primary Examiner* — David B. Thomas
(74) *Attorney, Agent, or Firm* — Chun-Ming Shih; LANWAY IPR SERVICES

(57) ABSTRACT

A hex wrench includes a first wrench body having a first end face, a first slot, a second slot, six first faces, a guide angle, and six first corners, and a second wrench body having a second end face, a first block, and a second block. The first block has two ends each provided with two second faces aligning with two of the first faces. Each of the two ends of the first block is provided with a second corner aligning with one of the first corners. A third corner is formed between one of the two second faces and the second end face and aligns with the guide angle. The second block has two ends each provided with a third face. A fourth corner is formed between the third face and the second end face and aligns with the guide angle.

8 Claims, 8 Drawing Sheets

HEX WRENCH STRUCTURE

BACKGROUND OF THE INVENTION

Field of the Invention

The present invention relates to a wrench and, more particularly, to a hex wrench structure.

Description of the Related Art

A conventional hex wrench structure was disclosed in the U.S. Pat. No. 5,237,893, and comprises a bit portion 26 and an interlobular fastener retention means 44. The bit portion 26 is provided with multiple bit lobes 40, multiple bit flutes 38, and a bore or keyway 42. The interlobular fastener retention means 44 is mounted in the bore 42. The bit portion 26 and the interlobular fastener retention means 44 are combined to operate a screw member that has a hexagonal recess.

However, such a conventional structure has the following disadvantages.

1. When the screw member is worn out, the bit portion 26 cannot be removed from the screw member easily.
2. As shown in FIG. 4, the interlobular fastener retention means 44 aligns with one of the bit flutes 38 and an end face of the bit portion 26 so that the interlobular fastener retention means 44 only aligns with the bit portion 26 at two positions, but does not align with the bit lobes 40 at all. Thus, the interlobular fastener retention means 44 cannot enhance the strength of the bit portion 26.
3. When the bit portion 26 is fitted into a bolt having a star-shaped bore, the bit lobes 40, the bit flutes 38, and the interlobular fastener retention means 44 are used to lock the inner face of the bolt so that the bolt is driven and rotated by the bit portion 26. In practice, the bit lobes 40 contact the inner face of the bolt exactly, but the interlobular fastener retention means 44 aligns with one of the bit flutes 38 and does not contact the inner face of the bolt, so that the interlobular fastener retention means 44 does not function when the bit portion 26 is rotated to drive the bolt.

BRIEF SUMMARY OF THE INVENTION

In accordance with the present invention, there is provided a hex wrench structure comprising a first wrench body and a second wrench body. The first wrench body is provided with a first end face, a first slot, a second slot, six first faces, a guide angle, and six first corners. The second wrench body is provided with a second end face, a first block, and a second block. The first block has two ends each of which is provided with two second faces. The two second faces align with two of the first faces. Each of the two ends of the first block is provided with a second corner. The second corner aligns with one of the first corners. A third corner is formed between one of the two second faces and the second end face. The third corner aligns with the guide angle. The second block has two ends each of which is provided with a third face. A fourth corner is formed between the third face and the second end face. The fourth corner aligns with the guide angle.

The hex wrench further comprises a screw member mounted on the first wrench body. The screw member is provided with a hexagonal recess, a bottom face, and six fourth faces. The first wrench body is loosely fitted into the hexagonal recess. After the screw member is rotated during a period of time, the screw member is worn out, so that the fourth faces form wear portions. Each of the wear portions is a concave face. Each of the fourth faces forms a bottom portion close to the bottom face.

According to the primary advantage of the present invention, after the first wrench body is fitted into the hexagonal recess, the first end face and the second end face rest on the bottom face. The wear portions will not extend to the bottom portion. The wear portions are tapered and decreased gradually from the opening of the hexagonal recess toward the bottom face. Each of the third corner and the fourth corner is a right angle. When the first wrench body is rotated, the second end face touches the bottom face, so that the two second faces, the second corner, the third corner, the third face, and the fourth corner are close to and can be rotated to the bottom portion. Thus, the screw member can be removed from the first wrench body.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
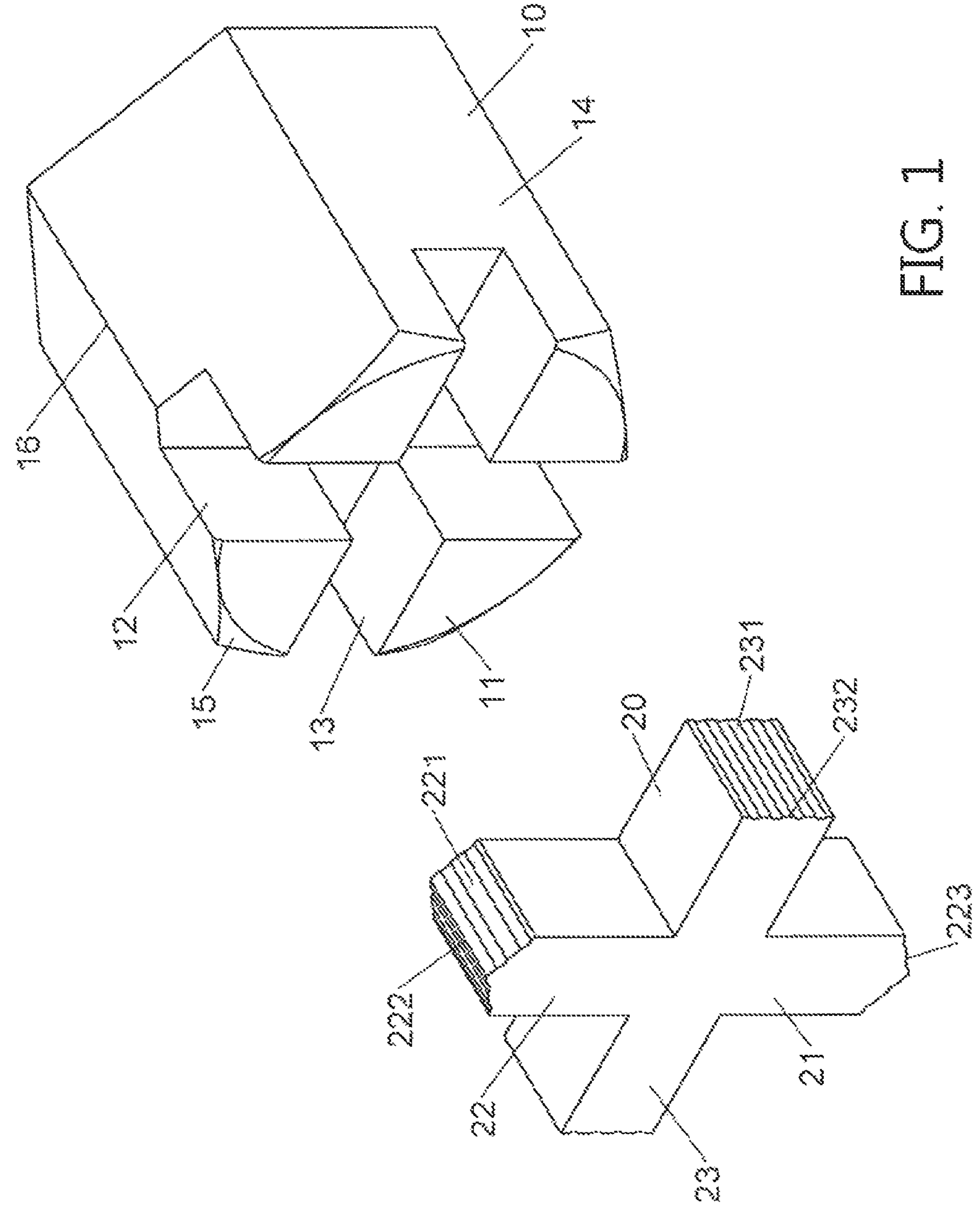
FIG. 1 is an exploded perspective view of a hex wrench structure in accordance with the first preferred embodiment of the present invention.

Referring to the drawings and initially to FIGS. 1-6, a hex wrench structure in accordance with the preferred embodiment of the present invention comprises a first wrench body 10 and a second wrench body 20.

The first wrench body 10 has a hexagonal cross-sectional profile. The first wrench body 10 has one end provided with a first end face 11. The first wrench body 10 is provided with a first slot 12 and a second slot 13. The first slot 12 and the second slot 13 are open at the first end face 11. The first slot 12 is connected to the second slot 13. The first wrench body 10 has six first faces 14. The first faces 14 are arranged in an annular shape relative to the first end face 11. Each of the first faces 14 is perpendicular to the first end face 11. The second slot 13 has two ends that are open at two of the first faces 14. A guide angle (or lead angle or chamfer) 15 is formed between the first end face 11 and the first faces 14. The guide angle 15 connects the first end face 11 and the first faces 14. The first wrench body 10 has six first corners 16 each of which is formed between two of the first faces 14. Each of the first corners 16 has a linear shape. The first slot 12 has two ends that are open at two of the first corners 16. The first slot 12 and the second slot 13 are open in three directions.

An axis 17 is defined in a lengthwise direction of the first wrench body 10. A first distance 171 is defined between two of the first corners 16. The first slot 12 has a width defining a second distance 172. The second slot 13 has a width defining a third distance 173. The third distance 173 is equal to the second distance 172. The second distance 172 is less than or equal to one half of the first distance 171.

The second wrench body 20 has one end provided with a second end face 21. The second end face 21 is directed toward the first end face 11. The second end face 21 and the first end face 11 are arranged at the same plane or almost arranged at the same plane. The second wrench body 20 is provided with a first block 22 and a second block 23. The first block 22 is received in the first slot 12. The second block 23 is received in the second slot 13. The first block 22 is closely fitted into the first slot 12 or the second block 23 is closely fitted into the second slot 13. The second wrench body 20 has a structural strength more than that of the first wrench body 10 or the second wrench body 20 is made of material greater than that of the first wrench body 10 or the second wrench body 20 has hardness more than that of the first wrench body 10.

The first block 22 has two ends each of which is provided with two second faces 221. The two second faces 221 align or coincide with two of the first faces 14. Each of the two ends of the first block 22 is provided with a second corner 222. The second corner 222 aligns or coincides with one of the first corners 16. The two second faces 221 are disposed at two sides of the second corner 222. The two second faces 221 are arranged symmetrically relative to the second corner 222 and one of the first corners 16. A third corner 223 is formed between one of the two second faces 221 and the second end face 21. The third corner 223 aligns with the guide angle 15. Each of the two second faces 221 is perpendicular to the second end face 21 so that the third corner 223 has a linear shape.

The second block 23 has two ends each of which is provided with a third face 231. The third face 231 aligns or coincides with one of the first faces 14. A fourth corner 232 is formed between the third face 231 and the second end face 21. The fourth corner 232 aligns with the guide angle 15. The second end face 21 is perpendicular to the third face 231 so that the fourth corner 232 has a linear shape.

In the preferred embodiment of the present invention, the guide angle 15 is a circular lead angle, the third corner 223 is a right angle different from the guide angle 15, and the fourth corner 232 is a right angle different from the guide angle 15.

Figure 2:
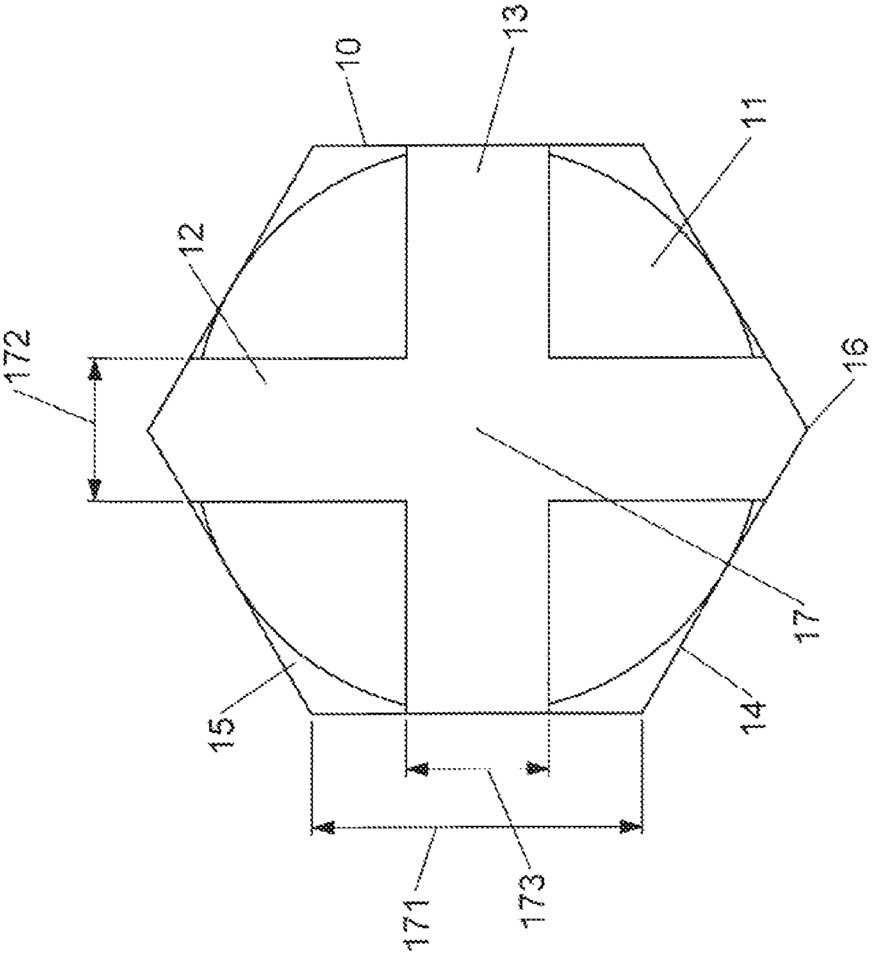
FIG. 2 is a front view of a first wrench body of the hex wrench structure as shown in FIG. 1.
Figure 3:
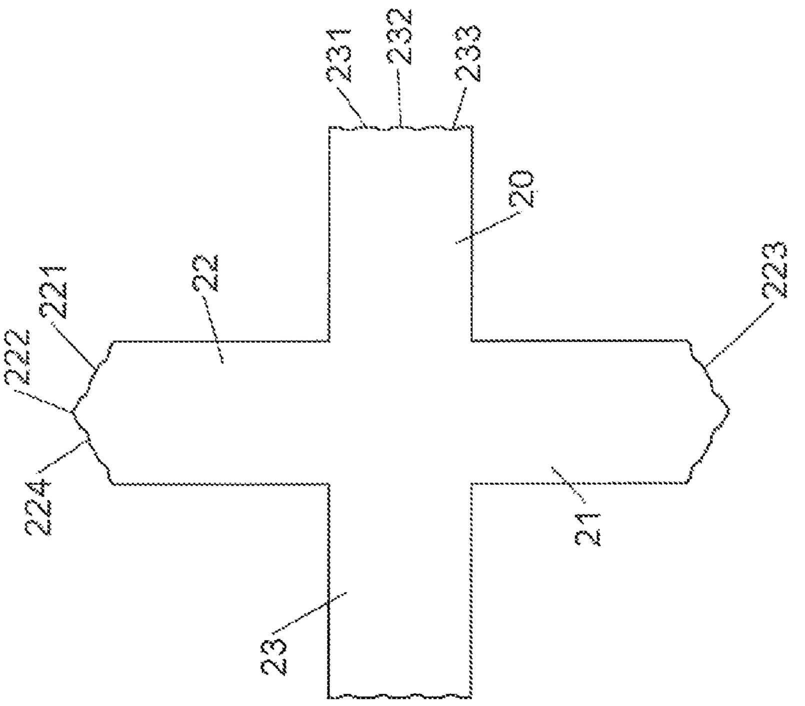
FIG. 3 is a front view of a second wrench body of the hex wrench structure as shown in FIG. 1.
Figure 4:
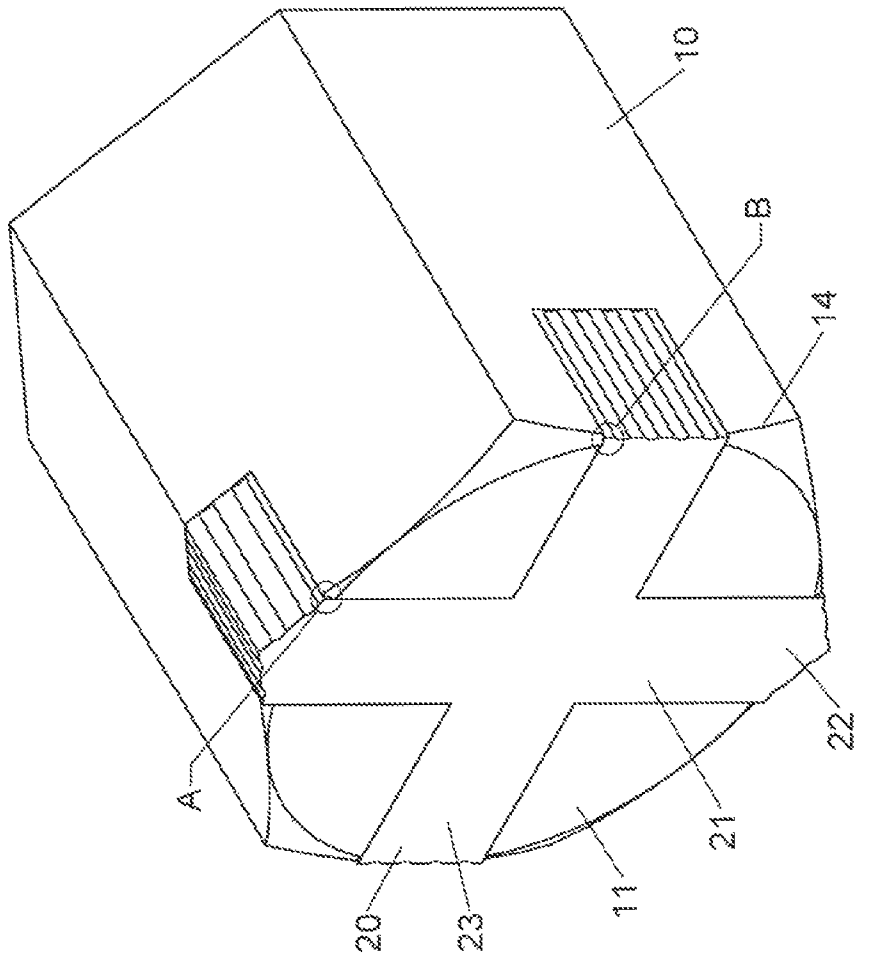
FIG. 4 is a perspective assembly of the hex wrench structure as shown in FIG. 1.

Referring to FIG. 4 with reference to FIGS. 1-3, the second wrench body 20 has a cruciform shape. The first block 22 is received in the first slot 12. The second block 23 is received in the second slot 13. The second end face 21 and the first end face 11 are located at the same plane. The second wrench body 20 is mounted in the first slot 12 and the second slot 13.

Figure 5:
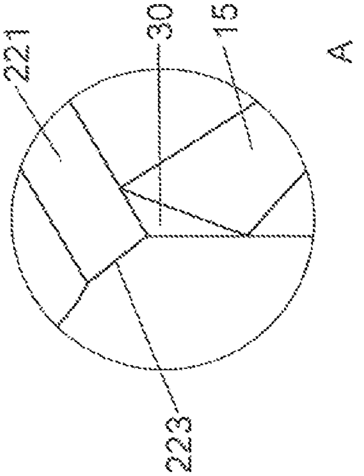
FIG. 5 is a locally enlarged view of the hex wrench structure taken along circle A as shown in FIG. 4.
Figure 6:
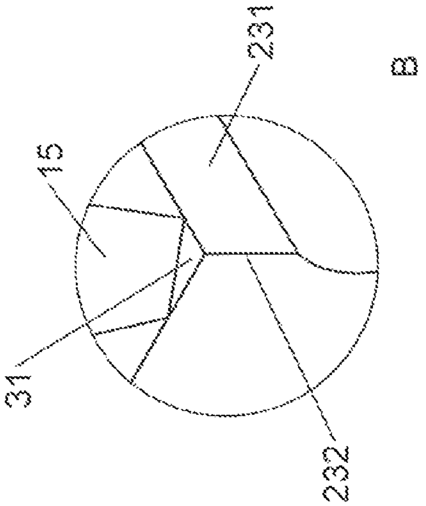
FIG. 6 is a locally enlarged view of the hex wrench structure taken along circle B as shown in FIG. 4.

Referring to FIGS. 5 and 6 with reference to FIGS. 1-4, a first abutting face 30 is formed between the third corner 223 and the guide angle 15. The first abutting face 30 is a drop (or fall) between the third corner 223 and the guide angle 15. The first abutting face 30 has a planar shape. A second abutting face 31 is formed between the fourth corner 232 and the guide angle 15. The second abutting face 31 is a drop (or fall) between the fourth corner 232 and the guide angle 15. The second abutting face 31 has a planar shape. The first abutting face 30 and the second abutting face 31 are situated at the second wrench body 20.

In the preferred embodiment of the present invention, the first end face 11 has a planar shape. The first slot 12 is perpendicular to the second slot 13. The first slot 12 and the second slot 13 form a cruciform shape. The guide angle 15 has a circular shape.

In the preferred embodiment of the present invention, the first block 22 is perpendicular to the second block 23. The first block 22 and the second block 23 form a cruciform shape.

In the preferred embodiment of the present invention, each of the two second faces 221 is provided with multiple first grooves 224. The first grooves 224 are disposed at two sides of the second corner 222. The first grooves 224 are arranged in a linear shape. Each of the first grooves 224 has an arcuate shape.

In the preferred embodiment of the present invention, the third face 231 is provided with multiple second grooves 233. The second grooves 233 are arranged in a linear shape. Each of the second grooves 233 has an arcuate shape.

Figure 8:
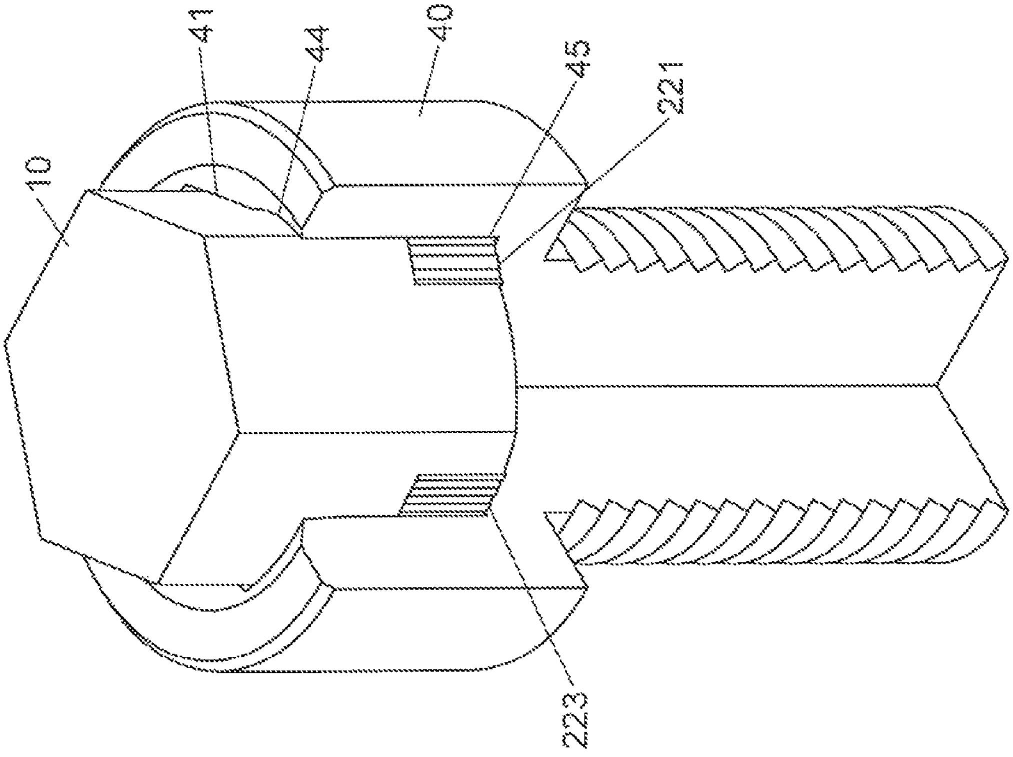
FIG. 8 is a perspective operational view showing the hex wrench structure is used to rotate the screw member.
Figure 7:
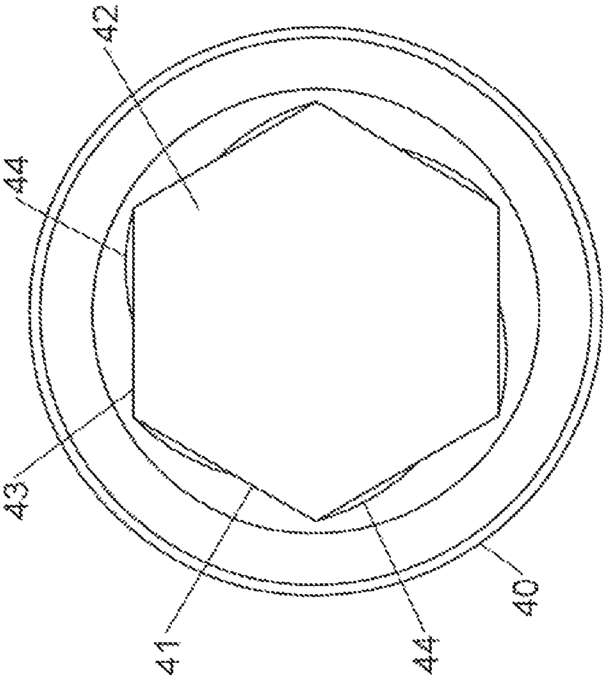
FIG. 7 is a top view of a screw member of the hex wrench in accordance with the preferred embodiment of the present invention.

Referring to FIGS. 7 and 8 with reference to FIGS. 1-4, the hex wrench structure further comprises a screw member 40 mounted on the first wrench body 10. The screw member 40 is an internal hexagonal screw member and provided with a hexagonal recess (or bore) 41, a bottom face 42, and six fourth faces 43. The first wrench body 10 is loosely fitted into the hexagonal recess 41. After the screw member 40 is rotated during a period of time, the screw member 40 is worn out, so that the fourth faces 43 form wear portions 44. Each of the wear portions 44 is a concave face. Each of the fourth faces 43 forms a bottom portion 45 close to the bottom face 42.

Figure 9:
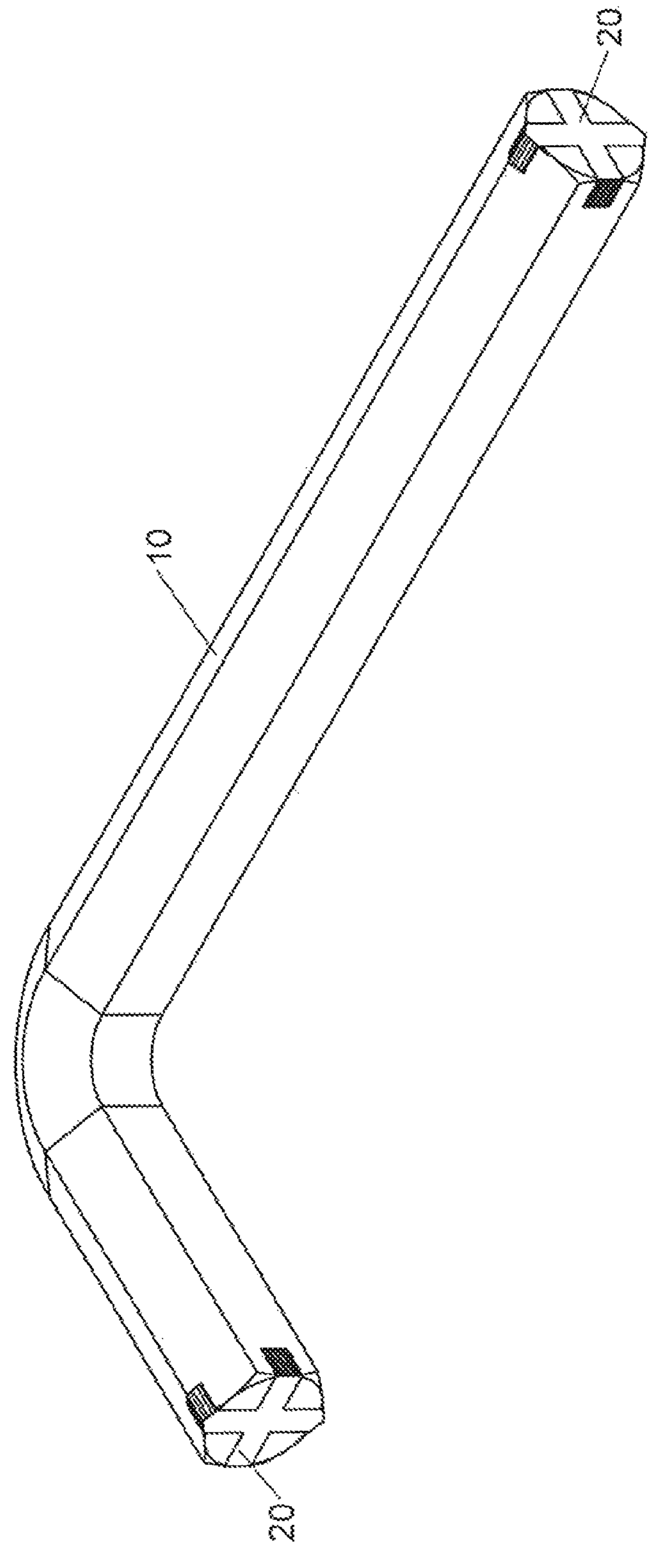
FIG. 9 is a perspective view of a hex wrench structure in accordance with the second preferred embodiment of the present invention.

Referring to FIG. 9, the first wrench body 10 has an L-shaped configuration. The first wrench body 10 has two ends each assembled with the second wrench body 20.

Figure 10:
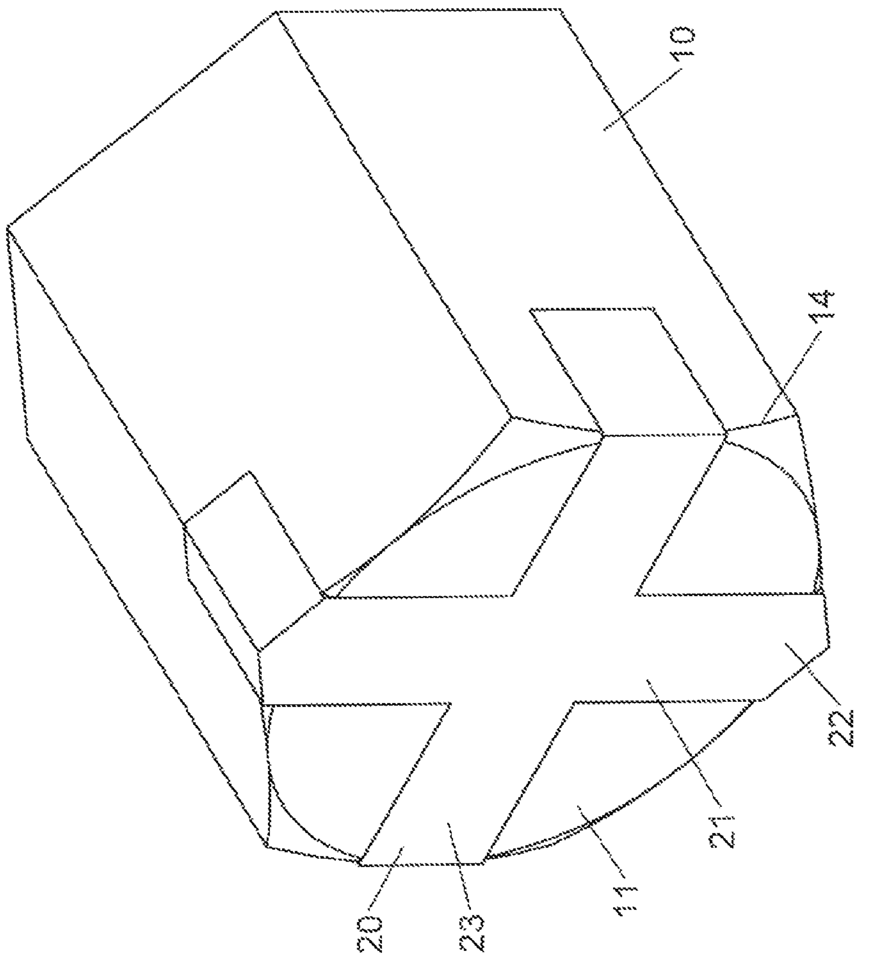
FIG. 10 is a perspective view of a hex wrench structure in accordance with the third preferred embodiment of the present invention.

Referring to FIG. 10 with reference to FIGS. 1-4, the first block 22 is not provided with the first grooves 224, and the second block 23 is not provided with the second grooves 233.

Figure 11:
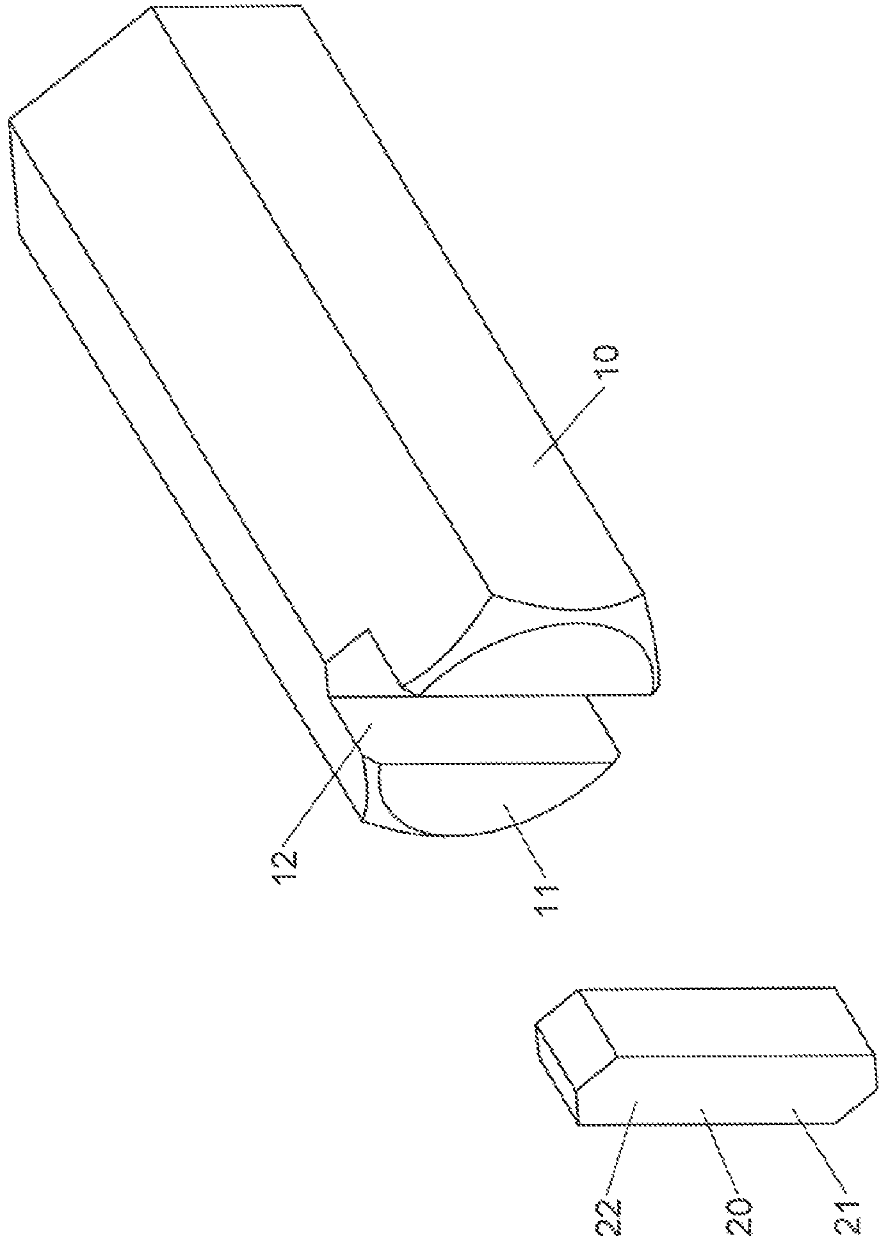
FIG. 11 is an exploded perspective view of a hex wrench structure in accordance with the fourth preferred embodiment of the present invention.

Referring to FIG. 11 with reference to FIGS. 1-4, the first wrench body 10 is only provided with the first slot 12 without defining the second slot 13, and the second wrench body 20 is only provided with the first block 22 without defining the second block 23.

Figure 12:
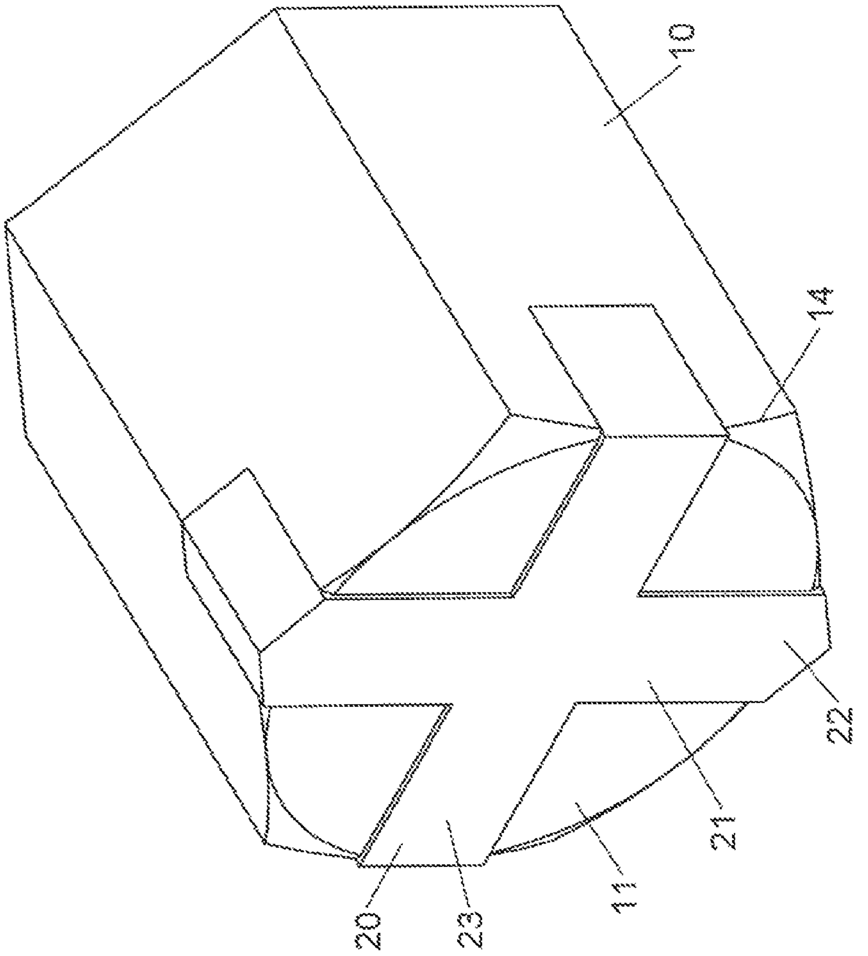
FIG. 12 is a perspective view of a hex wrench structure in accordance with the fifth preferred embodiment of the present invention.

Referring to FIG. 12 with reference to FIGS. 1-4, the second end face 21 partially protrudes outward from the first end face 11.

Accordingly, the hex wrench structure has the following advantages.

1. Referring to FIGS. 7 and 8 with reference to FIGS. 1-4, after the first wrench body 10 is fitted into the hexagonal recess 41, the first end face 11 and the second end face 21 rest on the bottom face 42. The wear portions

44 will not extend to the bottom portion 45. The wear portions 44 are tapered and decreased gradually from the opening of the hexagonal recess 41 toward the bottom face 42. Each of the third corner 223 and the fourth corner 232 is a right angle. When the first wrench body 10 is rotated, the second end face 21 touches the bottom face 42, so that the two second faces 221, the second corner 222, the third corner 223, the third face 231, and the fourth corner 232 are close to and can be rotated to the bottom portion 45. Thus, the screw member 40 can be removed from the first wrench body 10.

2. Each of the third corner 223 and the fourth corner 232 is a right angle. In such a manner, the second corner 222, the third corner 223, and the fourth corner 232 are closer to the bottom portion 45, so that the two second faces 221 and the third face 231 can be rotated to the bottom portion 45, and the first wrench body 10 can be rotated to rotate and loosen the worn screw member 40.
3. The guide angle 15 is a circular lead angle, and each of the third corner 223 and the fourth corner 232 is a right angle so that the guide angle 15 and each of the third corner 223 and the fourth corner 232 have different states and structures. Thus, the screw member 40 with the wear portions 44 is easily removed through the hexagonal recess 41.
4. The guide angle 15 and each of the third corner 223 and the fourth corner 232 have different states and structures, so that the guide angle 15 facilitates fitting of the first wrench body 10 with the screw member 40, while the third corner 223 and the fourth corner 232 facilitate rotation of the first wrench body 10 and the screw member 40.
5. The first wrench body 10 is provided with the first end face 11, the first faces 14, and the first corners 16. The second wrench body 20 is provided with the second end face 21 corresponding to the first end face 11, provided with the two second faces 221 and the third face 231 corresponding to the first faces 14, and provided with the second corner 222 corresponding to one of the first corners 16. Thus, the first wrench body 10 and the second wrench body 20 are combined to form a reinforced structure. In addition, each of the first wrench body 10 and the second wrench body 20 has three respective positions corresponding to the screw member 40 so that the first wrench body 10 and the second wrench body 20 are combined to rotate the screw member 40 easily.
6. The first faces 14, the guide angle 15, the first corners 16, the two second faces 221, the third face 231, the second corner 222, the third corner 223, the fourth corner 232, the first abutting face 30, and the second abutting face 31 provide multiple locking positions to construct a locking structure to facilitate rotation of the first wrench body 10 and the second wrench body 20, so that the first wrench body 10 will not be detached from the second wrench body 20 easily, to prevent the screw member 40 from forming the wear portions 44.
7. The second wrench body 20 is provided with the first grooves 224 and the second grooves 233 to distribute the applied stress and to increase more friction area.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A hex wrench structure comprising:
a first wrench body and a second wrench body;
wherein:
the first wrench body has a hexagonal cross-sectional profile;
the first wrench body has one end provided with a first end face;
the first wrench body is provided with a first slot and a second slot;
the first slot and the second slot are open at the first end face;
the first slot is connected to the second slot;
the first wrench body has six first faces;
the first faces are arranged in an annular shape relative to the first end face;
each of the first faces is perpendicular to the first end face;
the second slot has two ends that are open at two of the first faces;
a guide angle is formed between the first end face and the first faces;
the guide angle connects the first end face and the first faces;
the first wrench body has six first corners each of which is formed between two of the first faces;
each of the first corners has a linear shape;
the first slot has two ends that are open at two of the first corners;
the first slot and the second slot are open in three directions;
an axis is defined in a lengthwise direction of the first wrench body;
a first distance is defined between two of the first corners;
the first slot has a width defining a second distance;
the second slot has a width defining a third distance;
the third distance is equal to the second distance;
the second distance is less than or equal to one half of the first distance;
the second wrench body has one end provided with a second end face;
the second end face is directed toward the first end face;
the second end face and the first end face are arranged at the same plane or almost arranged at the same plane;
the second wrench body is provided with a first block and a second block;
the first block is received in the first slot;
the second block is received in the second slot;
the first block is closely fitted into the first slot or the second block is closely fitted into the second slot;
the first block has two ends each of which is provided with two second faces;
the two second faces align or coincide with two of the first faces;
each of the two ends of the first block is provided with a second corner;
the second corner aligns or coincides with one of the first corners;
the two second faces are disposed at two sides of the second corner;
the two second faces are arranged symmetrically relative to the second corner and one of the first corners;
a third corner is formed between one of the two second faces and the second end face;
the third corner aligns with the guide angle;

each of the two second faces is perpendicular to the second end face so that the third corner has a linear shape;

the second block has two ends each of which is provided with a third face;

the third face aligns or coincides with one of the first faces;

a fourth corner is formed between the third face and the second end face;

the fourth corner aligns with the guide angle;

the second end face is perpendicular to the third face so that the fourth corner has a linear shape;

the guide angle is a circular lead angle, the third corner is a right angle different from the guide angle, and the fourth corner is a right angle different from the guide angle;

a first abutting face is formed between the third corner and the guide angle;

the first abutting face is a drop between the third corner and the guide angle;

the first abutting face has a planar shape;

a second abutting face is formed between the fourth corner and the guide angle;

the second abutting face is a drop between the fourth corner and the guide angle;

the second abutting face has a planar shape; and the first abutting face and the second abutting face are situated at the second wrench body.

2. The hex wrench as claimed in claim 1, wherein:

the first end face has a planar shape;

the first slot is perpendicular to the second slot;

the first slot and the second slot form a cruciform shape; and the guide angle has a circular shape.

3. The hex wrench as claimed in claim 1, wherein:

the first block is perpendicular to the second block; and the first block and the second block form a cruciform shape.

4. The hex wrench as claimed in claim 1, wherein:

each of the two second faces is provided with multiple first grooves;

the first grooves are disposed at two sides of the second corner;

the first grooves are arranged in a linear shape; and each of the first grooves has an arcuate shape.

5. The hex wrench as claimed in claim 1, wherein:

the third face is provided with multiple second grooves;

the second grooves are arranged in a linear shape; and each of the second grooves has an arcuate shape.

6. The hex wrench as claimed in claim 1, further comprising:

a screw member mounted on the first wrench body;

wherein:

the screw member is an internal hexagonal screw member and provided with a hexagonal recess, a bottom face, and six fourth faces;

the first wrench body is loosely fitted into the hexagonal recess;

after the screw member is rotated during a period of time, the screw member is worn out, so that the fourth faces form wear portions;

each of the wear portions is a concave face; and each of the fourth faces forms a bottom portion close to the bottom face.

7. The hex wrench as claimed in claim 1, wherein the first wrench body has an L-shaped configuration and has two ends each assembled with the second wrench body.

8. The hex wrench as claimed in claim 1, wherein the second end face partially protrudes outward from the first end face.

* * * * *